(12) United States Patent
Åstrand et al.

(10) Patent No.: US 8,043,035 B2
(45) Date of Patent: Oct. 25, 2011

(54) COATED DRILL AND METHOD OF MAKING THE SAME

(75) Inventors: Maria Åstrand, Storvreta (SE); Peter Müller, Bad Homburg (DE); Thomas Schneider, St. Ingbert (DE); Thomas Heil, Bruchköbel (DE)

(73) Assignee: Sandvik Intellectual Property AB, Sandviken (SE)

( * ) Notice: Subject to any disclaimer, the term of this patent is extended or adjusted under 35 U.S.C. 154(b) by 981 days.

(21) Appl. No.: 11/896,743

(22) Filed: Sep. 5, 2007

(65) Prior Publication Data

US 2008/0056835 A1   Mar. 6, 2008

(30) Foreign Application Priority Data

Sep. 6, 2006  (DE) .................. 10 2006 042 226

(51) Int. Cl.
*B23B 51/02* (2006.01)

(52) U.S. Cl. .................. 408/144; 407/119; 76/108.6

(58) Field of Classification Search .......... 408/144–145, 408/230, 227, 229; 407/119; 76/108.1, 108.6, 76/115; *B23B 51/00, 51/02*
See application file for complete search history.

(56) References Cited

U.S. PATENT DOCUMENTS

| | | | |
|---|---|---|---|
| 5,330,853 A | 7/1994 | Hofmann et al. | |
| 6,213,692 B1 | 4/2001 | Guehring et al. | |
| 6,443,674 B1 | 9/2002 | Jaconi | |
| 6,558,749 B2 * | 5/2003 | Braendle | 427/419.7 |
| 6,688,817 B2 | 2/2004 | Borschert et al. | |
| 6,805,944 B2 * | 10/2004 | Oshika et al. | 428/216 |
| 7,785,700 B2 * | 8/2010 | Okada et al. | 428/216 |
| 2003/0148144 A1 | 8/2003 | Gates, Jr. et al. | |
| 2007/0284255 A1 * | 12/2007 | Gorokhovsky et al. | 205/89 |
| 2008/0152882 A1 * | 6/2008 | Selinder et al. | 428/216 |

FOREIGN PATENT DOCUMENTS

| | | |
|---|---|---|
| DE | 3939809 A1 * | 6/1991 |
| DE | 41 15 616 | 9/1992 |
| DE | 296 01 653 | 8/1996 |
| DE | 196 02 030 | 7/1997 |
| DE | 101 06 940 | 8/2001 |
| EP | 0 983 393 | 11/2003 |
| JP | 61-279409 | 12/1986 |
| JP | 61-288910 | 12/1986 |
| JP | 3-170215 | 7/1991 |
| JP | 05092304 A * | 4/1993 |
| JP | 7-237046 | 9/1995 |

(Continued)

OTHER PUBLICATIONS

An International Search Report dated Dec. 19, 2007 issued in PCT Application No. PCT/SE2007/050621.

*Primary Examiner* — Daniel Howell
(74) *Attorney, Agent, or Firm* — Drinker Biddle & Reath LLP

(57) ABSTRACT

The present invention relates to a drill comprising a cemented carbide or high speed steel substrate and a coating wherein the coating comprises: a first layer system having a multilayered structure covering substantially the whole active part of the drill, a second layer system having a multilayered structure covering only the tip area of the drill.

Drills according to the present invention have good wear resistance and improved properties when reconditioning the drill.

The present invention also relates to a method of making a drill according to the present invention.

9 Claims, 1 Drawing Sheet

FOREIGN PATENT DOCUMENTS

| | | | |
|---|---|---|---|
| JP | 08039317 A * | 2/1996 | |
| JP | 2002275618 A * | 9/2002 | |
| JP | 2003175406 A * | 6/2003 | |
| JP | 2004050385 A * | 2/2004 | |
| JP | 2005-52953 | 3/2005 | |
| JP | 2005-88149 | 4/2005 | |
| JP | 2006-82206 | 3/2006 | |
| WO | 98/48072 | 10/1998 | |

* cited by examiner

COATED DRILL AND METHOD OF MAKING THE SAME

BACKGROUND OF THE INVENTION

The present invention relates to a twist drill for metal machining coated with a first and a second layer system, wherein the first layer system has been deposited over substantially the whole active part of the twist drill whereas the second layer system has been deposited only onto the tip area of the twist drill. The present invention also relates to a method of manufacturing such a twist drill.

Twist drills are often coated with a hard material to increase tool life by enhancing the wear resistance. A high wear resistance is advantageous at the tip area of the twist drill where the cutting takes place whereas properties like low friction and smoothness are advantageous on other parts of the twist drill, for example, to enhance chip transportation. The chip transport is particularly important when the drilled depth is relatively large compared to the nominal diameter. In some cases, by coating the chip flutes, the chip transport can, compared to an uncoated drill, even be decreased. Hence, achieving optimum properties for different parts of a twist drill can be difficult and several attempts have been made to accomplish this.

Another problem, which especially applies to twist drills coated along the cylindrical land, is referred to as pitting or pitting wear and includes spalling of the wear resistant coating on the cylindrical land and typically in the area close to the drill corner.

Pitting often includes not only spalling of the deposited coating but also part of the substrate from the twist drill. When the drill is used for the first time it is not a problem as the main cutting edge and the rake face, which are the areas determining the life time of the drill, are not affected by the pitting. The pitting appears at a small distance from the corner and the main cutting edge. However, when the drill is reconditioned it is often reduced somewhat in length and hence the worn region comes close to the cutting region and therefore the pitting can be detrimental to the life time of a reconditioned drill. As cemented carbide twist drills are very expensive it is necessary that it can be cut, reground and recoated several times and hence pitting has to be minimized to enable this.

Recently, new types of hard coatings usually with a multilayered structure, particularly useful for the wear protection of the main cutting edge and the rake faces, have been developed. Unfortunately, such coatings are very strongly prone to such pitting formation.

EP 0 983 393 B describes aperiodic multilayered coatings which leads to an increased hardness and increased wear resistance of the cutting edge. An example of such coating is alternating TiN and (Ti,Al)N layers having an individual thickness in the nanometer range, 3-100 nm.

JP 7237046A describes a method of depositing a coating onto a drill where the coating becomes thicker in the tip area compared to the rest of the drill body. The difference in thickness is achieved by partly covering the drill with a loose fitting metal cylinder which causes a gradual decrease in the amount of deposited material further away from the drill tip.

U.S. Pat. No. 6,688,817 B2 describes a drill that has been pretreated by applying an abrasive material to merely the tip, i.e. by a microblasting operation to roughen the surface. Thereafter substantially the whole drill is coated with a hard material. The coated drill will after coating have a larger surface roughness on the drill tip compared to the rest of the drill.

DE 196 02 030A describes a drill where only the tip has been coated, leaving the rest of the drill uncoated. The coating can be TiN, (Ti,Al)N or Ti(C,N).

OBJECTS AND SUMMARY OF THE INVENTION

An object of the present invention is to provide a twist drill with good wear resistance at the tip area and with good chip transportation properties in other parts of the twist drill.

Another object of the present invention is to provide a twist drill which is well adapted to reconditioning including regrinding and recoating.

Yet another object of the present invention is to provide a twist drill that is less prone to pitting formation.

In one embodiment of the invention, there is provided a twist drill comprising a cemented carbide or high speed steel substrate and a coating wherein in that the coating comprises: a first layer system having a multilayered structure covering substantially the whole active part of the drill, and a second layer system having a multilayered structure covering only the tip area of the drill.

In another embodiment of the invention, there is provided a method of making a twist drill comprising providing a cemented carbide or high speed steel substrate depositing a first layer system having a multilayered structure onto the whole active part of the drill by using conventional PVD techniques, and depositing a second layer system having a multilayered structure onto the tip area of the drill using conventional PVD techniques.

DETAILED DESCRIPTION OF THE PREFERRED EMBODIMENTS

Figure 1:
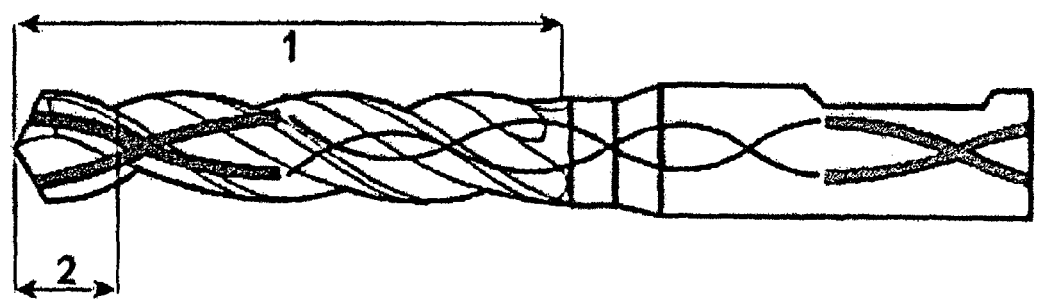
FIG. 1 and FIG. 2 show schematic drawings of a twist drill and its tip area wherein:
- 1—active part
- 2—tip area
- 3—chip flute
- 4—cylindrical land (margin)
- 5—main cutting edge
- 6—corner
- 7—rake face
Figure 2:
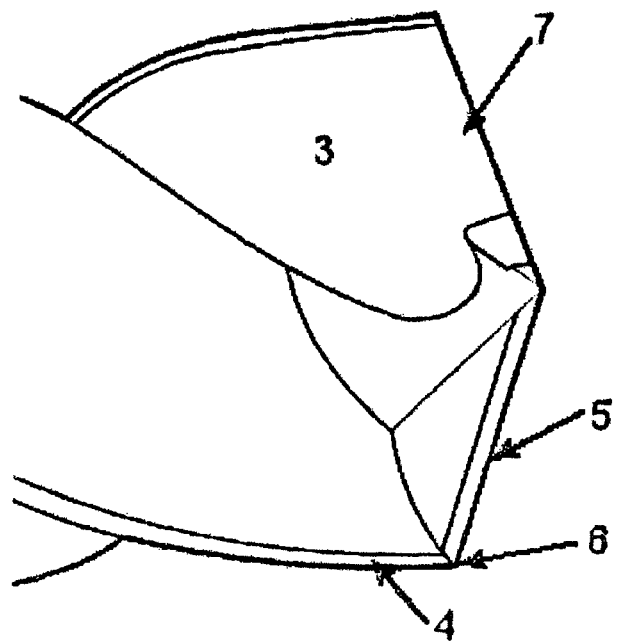

It has surprisingly been found that, by providing a twist drill with a first layer system deposited over its whole active part and a second layer system deposited only at the tip area of the drill, these objects can be fulfilled. It has also been found that pitting formation is avoided not only because the second layer system covers a relatively small area but also because this second layer system is deposited onto the first layer system, not directly onto the substrate, whereby, even if this second layer system spalls, the first layer system is not affected.

The present invention relates to a coated twist drill comprising a substrate body, preferably of cemented carbide or high speed steel, and a coating comprising two layer systems. The first layer system is deposited substantially over the whole active part of the twist drill whereas the second layer system is deposited only onto the tip area of the twist drill. The tip area is defined as the area reaching from the tip of the drill up to a distance, towards the base of the drill, of from about 0.30 to about 1.5 times the diameter of the drill.

The drill preferably has a diameter of from about 0.50 to about 35 mm, more preferably from about 2.0 to about 25 mm.

The first and second layer systems are both multilayered systems and the first and second layer system can be the same or different with regard to the thickness of the individual layers and the average chemical composition. By multilayered structure is herein meant a structure comprising at least 5, preferably at least 10 individual layers. However, it can comprise up to several thousand individual layers.

Each of the layer systems can be aperiodic, periodic or combinations thereof. The individual layer thickness in the layer systems can be between from about 0.5 to about 200 nm.

The suitable total thickness of the first and second layer system respectively is determined by the chemical composition of the coating as well as by the exact geometry of the drill.

In one embodiment, the total thickness of the first layer system measured on the peripheral surface is from about 0.5 μm to about 5 μm, preferably from about 0.5 to about 3 μm.

In another embodiment, the total thickness of the second layer system measured on the peripheral surface is from about 0.5 μm to about 5 μm, preferably from about 0.5 to about 3 μm.

In another embodiment, the total thickness of the second layer system measured on the peripheral surface is from about 3 μm to about 7 μm, preferably from about 5 to about 7 μm.

In one embodiment, the first and/or second layer system, can comprise an aperiodic structure, either throughout the whole layer system, or as one or more sections of the layer system.

By aperiodic is understood that the thickness of a particular individual layer in the multilayered structure does not depend on the thickness of an individual layer immediately beneath nor does it bear any relation to an individual layer above the particular individual layer. Hence, the multilayered structure does not have any repeat period in the sequence of individual layer thicknesses.

The composition of each individual layer in the multilayered structure cannot easily be measured without contribution from adjacent layers due to the low thickness. What can be measured is the average composition over the whole multilayer structure. However, the composition of each individual layer can be estimated from the composition of the targets, the sources used for the individual layers during deposition, but that does not give an exact composition. When thicker layers have been deposited, thick enough to be analysed individually, it has been found that the composition of the deposited layers can differ with a few percentages compared to the composition of the target material. Due to this fact any composition of the individual layers of the multilayered structure according to the present invention mentioned herein after are estimations from the compositions of the targets used during the deposition.

If an aperiodic section is present in the first and/or second layer system, the thickness of each individual layer within the aperiodic section will vary due to the aperiodic nature. However, the thickness of the individual layers is larger than about 0.5 nm but smaller than about 100 nm, preferably larger than about 1 nm but smaller than about 50 nm, most preferably larger than about 2 nm but smaller than about 30 nm. The sum of any ten consecutive layers in such a multilayered structure is preferably less than about 300 nm.

In one embodiment of the present invention, the first and/or second layer system comprises at least two, preferably at least five, aperiodic multilayered structures which are periodically alternated with thicker homogeneous layers. The thickness of the individual layers in the aperiodic multilayered structure is preferably from about 0.5 to about 100 nm, more preferably from about 1 to about 50 nm and most preferably from about 2 to about 30 nm. The thickness of the homogeneous layers is preferably from about 25 to about 200, more preferably from about 50 to about 120 nm.

The individual layers of the first and/or second layer systems comprises metalnitrides where one or more of the metal elements are selected from titanium (Ti), aluminium (Al), silicon (Si), chromium (Cr), niobium (Nb), hafnium (Hf), vanadium (V), tantalum (Ta), molybdenum (Mo), zirconium (Zr), tungsten (W), preferably from titanium (Ti), aluminium (Al), silicon (Si), chromium (Cr).

In one embodiment of the present invention, the average stoichiometry for the first and/or second layer system, as measured on the peripheral surface of the twist drill by e.g. microprobe or EDS is $(Ti_aAl_bSi_cCr_d)N$ where a is greater than 0 and less than about 0.90, b is greater than about 0.10 and less than about 0.70, c is equal to or greater than 0 and less than about 0.15, d is greater than 0 less than about 0.30, and $a+b+c+d=1$.

In one embodiment of the present invention, the first layer system is an aperiodic multilayered structure varying (Ti, Al)N layers with different Ti-content wherein the average chemical composition of the layer system is $(Ti_xAl_{1-x})N$ where x is greater than about 0.30 and less than about 0.70, preferably x is greater than about 0.40 and less than about 0.60.

In another embodiment of the present invention, the first layer system comprises at least two, preferably at least five, aperiodic multilayered structures varying (Ti,Al)N layers with different Ti-content wherein the aperiodic multilayered structures are repeatedly alternated with (Ti,Al)N homogeneous layers. The composition of the homogenous layers is $(Ti_yAl_{1-y})N$ where y is greater than about 0.35 and less than about 0.65, preferably y is greater than about 0.40 and less than about 0.60 and the average composition of the multilayered structure is $(Ti_zAl_{1-z})N$ where z is greater than about 0.50 and less than about 0.90, preferably z is greater than about 0.70 and less than about 0.90.

In yet another embodiment of the present invention, the second layer system is an aperiodic multilayered structure varying (Ti,Al)N layers with different Ti-content wherein the average chemical composition of the layer system is $(Ti_xAl_{1-x})N$ where x is greater than about 0.30 and less than about 0.70, preferably x is greater than about 0.40 and less than about 0.60.

In yet another embodiment of the present invention, the second layer system is an aperiodic or periodic (Ti,Si)N+(Al, Cr)N multilayered structure wherein the thickness of the individual layers is between about 0.5 and about 200 nm with an average chemical composition of $(Ti_aAl_bSi_cCr_d)N$ where a is greater than about 0.30 and less than about 0.75, preferably a is greater than about 0.40 and less than about 0.65, b is greater than about 0.20 and less than about 0.45, preferably b is greater than about 0.20 and less than about 0.35, where c is greater than 0 and less than about 0.15, preferably c is greater than about 0.02 and less than about 0.10, where d is less than about 0.02 and less than about 0.25, preferably d is greater than about 0.05 and less than about 0.20 and $a+b+c+d=1$.

In one embodiment of the present invention, the second layer system is an aperiodic multilayered structure varying (Ti,Al)N layers having different Ti-content wherein the thickness of the individual layers is between about 0.5 and about 30 nm, and wherein the average chemical composition is $(Ti_kAl_{1-k})N$ where k is greater than about 0.50 and less than about 0.90, preferably k is greater than about 0.70 and less than about 0.90.

For several reasons, it is advantageous to provide the first and second layer systems with different colors. First, a different color of the second layer system can be advantageous for wear detection. Since the tip area is subjected to extensive wear compared to other parts of the drill, visual wear detection is a big advantage. The visual detection is also advantageous in the area that is subjected to pitting. As it is necessary to remove the larger part of these worn regions when reconditioning, a color facilitating visual detection is to prefer.

Different colors also give another advantage during reconditioning. Normally when recoating a drill with only one thick functional coating over the whole active part of the drill the total coating thickness increases for each recoating. An increased coating thickness on the margin will increase the wear on the margin, at a short distance from the corner. Hence, when the drill has been reconditioned several times it most likely has to be cut to a substantially shorter length to remove the severe wear. According to the present invention, the second layer system is only applied to the tip area which is partly cut away when reconditioned and thus shifting the tip area further up the drill towards the shaft. This leads to a slower build-up of coating since parts only coated with the first layer system will enter the tip area and those parts will initially have no build-up. Since the wear on the margin is dependent of the thickness of the coating, less build-up will lead to less wear. This means that a drill according to the present invention do not have to be cut off as much as a conventional drill during reconditioning in order to remove the worn parts and could thus be reconditioned more times. During reconditioning it is thus a big advantage to have different colors of the first and second layer system to monitor the build-up of coating.

The colors of the first and second layer systems can be achieved by either choosing a coating having a specific intrinsic color, or, by depositing a thin top layer having giving the specific color.

In one embodiment of the present invention, the first layer system further comprises a top layer of sufficient thickness, preferably from about 0.1 to about 1 µm, of $Ti_{1-x}Al_xN$ where x is equal to or greater than about 0.40 and equal to or less than about 0.70, preferably $Ti_{0.33}Al_{0.67}N$ or $Ti_{0.50}Al_{0.50}N$ to give a visible, black intrinsic color.

In yet another embodiment of the present invention, the second layer system further comprises a top layer, having a lighter color than the first layer system, of sufficient thickness, preferably from about 0.1 to about 1 µm, preferably of $Ti_{0.75}Al_{0.25}N$, $Ti_{0.84}Al_{0.16}N$, $Ti_{0.90}Si_{0.10}N$ or TiN to give a visible, bronze or yellow intrinsic color.

The present invention also relates to a method of making a coated twist drill. The method comprises providing a substrate body with the shape of a twist drill preferably having a diameter of from about 0.5 to about 35 mm, more preferably from about 2 to about 25 mm, preferably of cemented carbide or high speed steel. Onto said substrate, two layer systems are deposited using conventional PVD techniques, where the first layer system is deposited substantially over the whole active part of the drill whereas the second layer system is deposited only onto the tip area of the drill.

The first and second layer system can be the same or different with regard to thickness of the individual layers and chemical composition. Each of the layer systems can be aperiodic, periodic or combinations thereof. The individual layers of the layer systems are deposited so that the thickness preferably is between from about 0.5 to about 200 nm.

In one embodiment of the present invention, the first and/or second layer system is deposited in such a way that it comprises an aperiodic structure, either throughout the whole layer system, or as one and more sections of the layer system.

The aperiodic structure, if such a section is present in a layer system, is obtained by, during the deposition process, randomly opening and closing shutters from individual layer targets, or by randomly switching said targets on and off. Another conceivable method is by randomly rotating or moving the to-be-coated substrates, in front of said targets. This is preferably done by placing the substrates on a 3-fold rotating substrate table arranged in order to obtain the aperiodic structure. The 3-fold rotation can be adjusted with regard to rotating speed and rotating direction, clockwise or counter clockwise. The aperiodic section will because of this comprise individual layers with a thickness that will vary due to the aperiodic nature.

The aperiodic structure is preferably deposited in such a way that the thickness of the individual layers is larger than about 0.5 nm but smaller than about 100 nm, preferably larger than about 1 nm but smaller than about 50 nm, most preferably larger than about 2 nm but smaller than about 30 nm. The sum of any ten consecutive layers in such a multilayered structure is less than about 300 nm.

In one embodiment of the present invention, the first and/or second layer system is deposited in such a way that it comprise at least two, preferably at least five, aperiodic multilayered structures which are periodically alternated with thicker homogeneous layers. The thickness of the individual layers in the aperiodic multilayered structure is preferably from about 0.5 to about 100 nm, more preferably from about 1 to about 50 nm and most preferably from about 2 to about 30 nm. The thickness of the homogeneous layers is preferably from about 25 to about 200, more preferably from about 50 to about 120 nm.

After deposition of the first layer system, parts of the twist drills are shielded by placing them into tight fitting metal cylinders so that only the tip area is exposed for deposition of the second layer system. The tip area is defined as the area reaching from the tip of the drill up to a distance, towards the base of the drill, of from about 0.3 to about 1.5 times the diameter of the drill.

The metal cylinder has a tight fit to the twist drill to avoid deposition on the inside of the metal cylinder but also to achieve a sharp and visible border to the second layer system. This gives good control of the total coating thickness in each point of the drill.

Finally, the drills are preferably post treated to obtain a smooth surface, by, e.g. wet blasting, dry blasting, polishing, grinding, brushing, etc.

The suitable total thickness of the first and second layer system, respectively, is determined by the chemical composition of the coating as well as by the exact geometry of the drill.

In one embodiment, the total thickness of the first layer system measured on the peripheral surface is from about 0.5 µm to about 5 µm, preferably from about 0.5 to about 3 µm.

In another embodiment the total thickness of the second layer system measured on the peripheral surface is from about 0.5 µm to about 5 µm, preferably from about 0.5 to about 3 µm.

In yet another embodiment the total thickness of the second layer system measured on the peripheral surface is from about 3 µm to about 7 µm, preferably from about 5 to about 7 µm.

In one embodiment, after the deposition of the first layer system, the drills are subjected to an intermediate post treatment operation, using wet blasting.

Most PVD techniques can be used according the present invention. However, the first and second layer systems are preferably deposited using cathodic arc evaporation using two or three pairs of arc targets of alloys of one or more metal elements selected from titanium (Ti), aluminium (Al), silicon (Si), chromium (Cr), niobium (Nb), hafnium (Hf), vanadium (V), tantalum (Ta), molybdenum (Mo), zirconium (Zr) or tungsten (W), preferably selected from titanium (Ti), aluminium (Al), silicon (Si) and chromium (Cr) or mixtures thereof, in a $N_2$ or mixed $N_2$+Ar gas atmosphere.

In one embodiment, the targets used during deposition are chosen so that the average stoichiometry for the first and/or second layer system, as measured on the peripheral surface of the twist drill by e.g. microprobe or EDS is $(Ti_aAl_bSi_cCr_d)N$ where a is greater than 0 and less than about 0.90, b is greater than about 0.10 and less than about 0.70, c is greater than 0 and less than about 0.15, d is greater than 0 and less than about 0.30, and $a+b+c+d=1$.

In one embodiment of the present invention, the first layer system is deposited is such a way that it will comprise an aperiodic multilayered structure varying (Ti,Al)N layers with different Ti-content wherein the average chemical composition of the layer system is $(Ti_xAl_{1-x})N$ where x is greater than about 0.30 and less than about 0.70, preferably x is greater than about 0.40 and less than about 0.60.

In another embodiment of the present invention, the first layer system is deposited is such a way that it will comprise at least two, preferably at least five, aperiodic multilayered structures varying (Ti,Al)N layers with different Ti-content wherein the aperiodic multilayered structures are repeatedly alternated with (Ti,Al)N homogeneous layers. The composition of the homogenous layers is $(Ti_yAl_{1-y})N$ where y is greater than about 0.35 and less than about 0.65, preferably y is greater than about 0.40 and less than about 0.60, and the average composition of the multilayered structure is $(Ti_zAl_{1-z})N$ where z is greater than about 0.50 and less than about 0.90, preferably z is greater than about 0.70 and less than about 0.90.

In yet another embodiment of the present invention, the second layer system is deposited is such a way that it will comprise an aperiodic multilayered structure varying (Ti, Al)N layers with different Ti-content wherein the average chemical composition of the layer system is $(Ti_xAl_{1-x})N$ where x is greater than about 0.30 and less than about 0.70, preferably x is greater than about 0.40 and less than about 0.60.

In yet another embodiment of the present invention, the second layer system is deposited is such a way that it will comprise an aperiodic or periodic (Ti,Si)N+(Al,Cr)N multilayered structure wherein the thickness of the individual layers is between about 0.5 and about 200 nm with an average chemical composition of $(Ti_aAl_bSi_cCr_d)N$ where a is greater than about 0.30 and less than about 0.75, preferably a is greater than about 0.40 and less than about 0.65, where b is greater than about 0.20 and less than about 0.45, preferably b is greater than about 0.20 and about 0.35, where c is greater than 0 and less than about 0.15, preferably c is greater than about 0.02 and less than about 0.10, where d is greater than about 0.02 and less than about 0.25, preferably d is greater than about 0.05 and less than about 0.20, and $a+b+c+d=1$.

In yet another embodiment of the present invention, the second layer system is deposited is such a way that it will comprise an aperiodic multilayered structure varying (Ti, Al)N layers having different Ti-content wherein the thickness of the individual layers is between about 0.5 and about 30 nm, and wherein the average chemical composition is $(Ti_kAl_{1-k})N$ where k is greater than about 0.50 and less than about 0.90, preferably k is greater than about 0.70 and less than about 0.90.

In yet another embodiment, onto the first layer system, a top layer of sufficient thickness, preferably 0.1-1 μm, is deposited. The top layer preferably have a composition of $Ti_{1-x}Al_xN$ where x is greater than about 0.40 and equal to or less than about 0.70, preferably $Ti_{0.33}Al_{0.67}N$ or $Ti_{0.50}Al_{0.50}N$ to give a visible, black intrinsic color.

In yet another embodiment, onto the second layer system, a top layer, having a lighter color than the first layer system, of sufficient thickness, preferably from about 0.1 to about 1 μm, is deposited. The top layer preferably has composition of $Ti_{0.75}Al_{0.25}N$, $Ti_{0.84}Al_{0.16}N$, $Ti_{0.90}Si_{0.10}N$ or TiN to give a visible, bronze or yellow intrinsic color.

The invention is additionally illustrated in connection with the following examples, which are to be considered as illustrative of the present invention. It should be understood, however, that the invention is not limited to the specific details of the examples.

Example 1

Invention

Coated 8 mm drills according to the present invention were made by depositing a first and a second layer system, both having aperiodic multilayer structures, using reactive PVD arc discharge evaporation onto cemented carbide drills with a composition of 10 wt-% Co and balance WC. The multilayer structures were deposited from two arc targets, 1 and 2, with the drills mounted on a 3-fold rotating substrate table arranged in order to obtain the aperiodic structure. The arc evaporation was performed in an Ar+$N_2$-atmosphere. After depositing the first layer system, the drills were subjected to a wet blasting treatment. Before depositing the second layer system, a part of the drill was shielded by a cylinder so that only the tip area of the drill was coated with the second layer system. The tip area was the area from the tip and approximately 10 mm from the tip. The composition of the two arc targets and the average composition of the first and second layer system are shown in Table 1.

The multilayered structure had a sequence of individual layers with an aperiodic, i.e. non-repetitive thickness. Cross section transmission electron microscopy investigation revealed that the individual nitride layer thicknesses ranged from 2 to 30 nm, and the total number of layers in each layer system exceeded 100.

TABLE 1

| Drill No. | Layer system | Target 1 | Target 2 | Average chemical composition | Thickness (μm) |
|---|---|---|---|---|---|
| 1 (inv.) | $1^{st}$ | $Ti_{0.75}Al_{0.25}$ | $Ti_{0.33}Al_{0.67}$ | $Ti_{0.50}Al_{0.50}N$ | 1.2 |
| | $2^{nd}$ | $Ti_{0.75}Al_{0.25}$ | $Ti_{0.33}Al_{0.67}$ | $Ti_{0.50}Al_{0.50}N$ | 6.6 |

Example 2

Reference

Coated 8 mm drills were made where the drills were either coated with only one layer system over the whole active part of the drill, or, coated with one layer system covering only the tip part of the drill. The layer systems both had aperiodic multilayer structures and were deposited using reactive PVD arc discharge evaporation onto cemented carbide drills with a composition of 10 wt-% Co and balance WC. The multilayer structures were deposited from two arc targets with the drills mounted on a 3-fold rotating substrate table arranged in order to obtain the aperiodic structure. The evaporation was performed in an Ar+N$_2$ gas mixture.

The tip area was the area from the tip and about 10 mm from the tip. The compositions of the two arc targets and the average composition of the layer systems are shown in Table 2.

The multilayered structure had a sequence of individual layers with an aperiodic, i.e. non-repetitive thickness. Cross section transmission electron microscopy investigation revealed that the individual nitride layer thicknesses ranged from 2 to 30 nm, and the total number of layers in each layer system exceeded 100.

TABLE 2

| Drill No. | Layer system | Target 1 | Target 2 | Average chemical composition | Thickness (μm) |
|---|---|---|---|---|---|
| Ref. 1 | 1$^{st}$ | Ti$_{0.75}$Al$_{0.25}$ | Ti$_{0.33}$Al$_{0.67}$ | Ti$_{0.50}$Al$_{0.50}$N | 1.2 |
|  | 2$^{nd}$ | — | — | — | — |
| Ref. 2 | 1$^{st}$ | — | — | — | — |
|  | 2$^{nd}$ | Ti$_{0.75}$Al$_{0.25}$ | Ti$_{0.33}$Al$_{0.67}$ | Ti$_{0.50}$Al$_{0.50}$N | 6.6 |

Example 3

Drills made according to Example 1 were compared to Ref. 1 in Example 2. Two drills of each drill type were tested in a drilling operation during the following cutting conditions:

| Work piece material: | Tool Steel, 42CrMo4 |
|---|---|
| Operation: | Drilling |
| V$_c$ m/min | 130 |
| Feed mm/rev | 0.30 |
| V$_f$ mm/min | 1460 |
| t$_1$ mm | 20 |

Note:
Wet conditions, emulsion 6%

The results can be seen below. The tool life travel is an average of two tests.

TABLE 3

| Drill type No. | Tool life travel (m) |
|---|---|
| 1 (Invention) | 55 |
| Ref. 1 | 31 |

Example 4

A drill made according to the present invention was compared to Ref. 2. Two drills of each drill type were tested in a drilling operation during the following cutting conditions:

| Work piece material: | Tool Steel, 42CrMo4 |
|---|---|
| Operation: | Drilling |
| V$_c$ m/min | 130 |
| Feed mm/rev | 0.30 |
| V$_f$ mm/min | 1460 |
| t$_1$ mm | 20 |

Note:
Wet conditions, emulsion 6%

The results can be seen below. The tool life travel is an average of two tests.

TABLE 4

| Drill type No | Tool life travel (m) |
|---|---|
| 1 (Invention) | 55 |
| Ref. 2 | 40 |

Example 5

A drill made according to the present invention was compared to two different competitor drills, Comp. 1 and Comp. 2, which are suitable for this type of drilling operation. Two drills of each drill type were tested in a drilling operation during the following cutting conditions:

| Work piece material: | Tool Steel, 55NiCrMoV6 |
|---|---|
| Operation: | Drilling |
| V$_c$ m/min | 140 |
| Feed mm/rev | 0.30 |
| V$_f$ mm/min | 1573 |
| t$_1$ mm | 38 |

Note:
Wet conditions, emulsion 6%

The results can be seen below. The tool life travel is an average of two tests.

TABLE 5

| Drill type No | Tool life travel (m) |
|---|---|
| 1 (Invention) | 58 |
| Comp. 1 | 13 |
| Comp. 2 | 22 |

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

The invention claimed is:

1. A twist drill comprising a cemented carbide or high speed steel substrate and a coating wherein the coating comprises:
   a first layer system having a multilayered structure covering substantially a whole active part of the drill, and
   a second layer system having a multilayered structure covering the first layer system at only a tip area of the drill.

2. A twist drill of claim 1 wherein the tip area of the drill is defined as a distance from the tip to a distance towards a base of the drill of from about 0.3 to about 1.5 times a diameter of the drill.

3. A twist drill of claim 1 wherein the first layer system and second layer systems are comprised of metalnitrides where metal elements are selected from titanium (Ti), aluminium (Al), silicon (Si), chromium (Cr), niobium (Nb), hafnium (Hf), vanadium (V), tantalum (Ta), molybdenum (Mo), zirconium (Zr), tungsten (W), and mixtures thereof.

4. A twist drill of claim 1 wherein at least one of the first layer system and the second layer system comprises a section having an aperiodic structure.

5. A method of making a twist drill comprising:
providing a cemented carbide or high speed steel substrate;
depositing a first layer system having a multilayered structure onto a whole active part of the drill, and
depositing a second layer system having a multilayered structure onto the first layer system at a tip area of the drill.

6. A method of claim 5 wherein parts of the drill are shielded by a tight fitting cylinder prior to depositing of the second layer system.

7. A method of claim 5 wherein the tip area of the drill is defined as a distance from the tip that extends towards a base of the drill about 0.3 to about 1.5 times the diameter of the drill.

8. A method of claim 5 wherein the first and second layer systems are deposited using cathodic arc evaporation using arc targets of alloys of metal elements selected from titanium (Ti), aluminium (Al), silicon (Si), chromium (Cr), niobium (Nb), hafnium (Hi), vanadium (V), tantalum (Ta), molybdenum (Mo), zirconium (Zr), tungsten (W), and mixtures thereof.

9. A method of claim 5, wherein the step of depositing the first layer system further comprises using PVD techniques to deposit the first layer system, and
wherein the step of depositing the second layer system further comprises using PVD techniques to deposit the second layer system.

* * * * *